No. 860,866. PATENTED JULY 23, 1907.
M. W. HEYENGA.
VEHICLE AXLE.
APPLICATION FILED MAY 31, 1906.
2 SHEETS—SHEET 1.
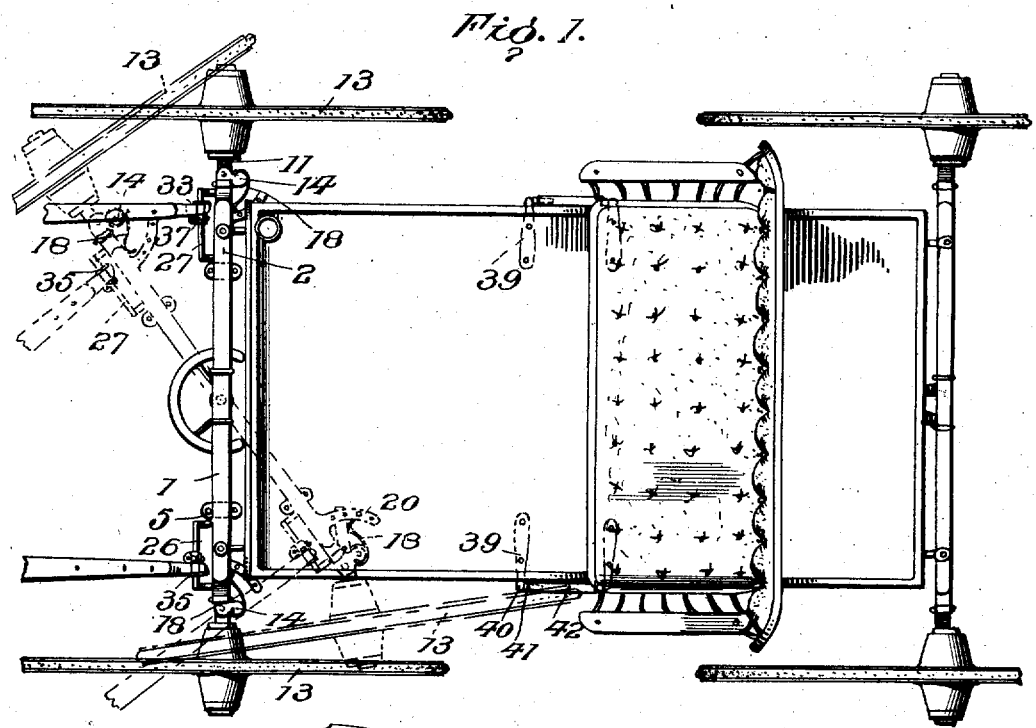
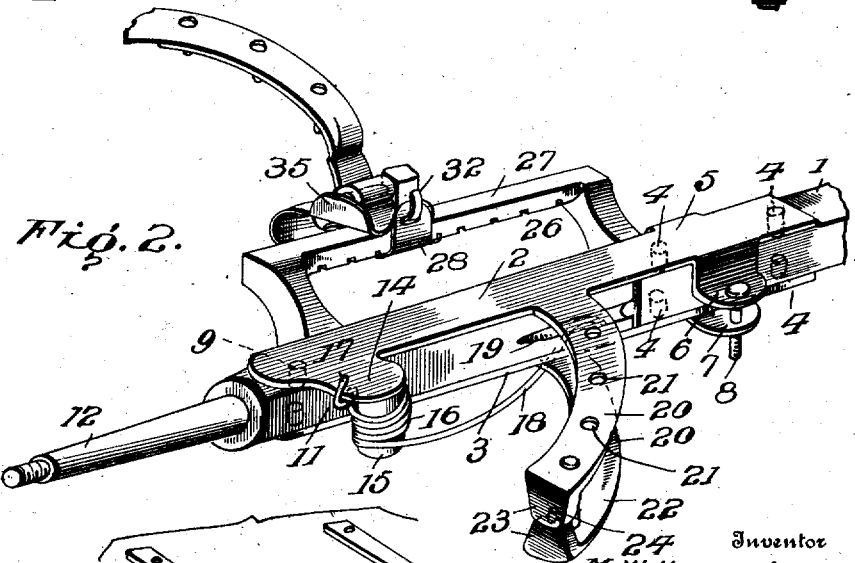

No. 860,866. PATENTED JULY 23, 1907.
M. W. HEYENGA.
VEHICLE AXLE.
APPLICATION FILED MAY 31, 1906.
2 SHEETS—SHEET 2.
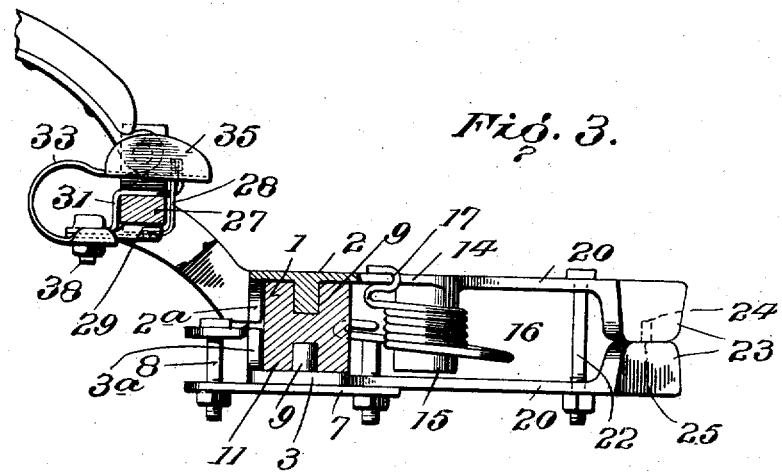
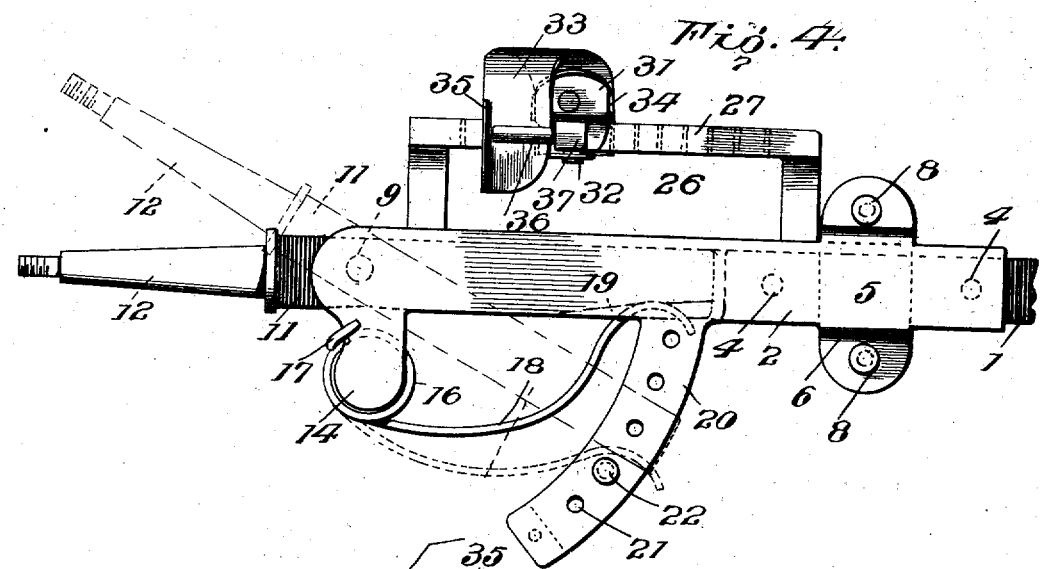

UNITED STATES PATENT OFFICE.

MARTIN W. HEYENGA, OF HARTSBURG, ILLINOIS.

VEHICLE-AXLE.

No. 860,866.  Specification of Letters Patent.  Patented July 23, 1907.

Application filed May 31, 1906. Serial No. 319,546.

*To all whom it may concern:*

Be it known that I, MARTIN W. HEYENGA, a citizen of the United States, residing at Hartsburg, in the county of Logan and State of Illinois, have invented certain new and useful Improvements in Vehicles, of which the following is a specification.

My present invention contemplates certain new and useful improvements in vehicles and the object of the invention is to provide certain improvements, which will be fully described and claimed, in that type of vehicle embodying a front axle constructed in sections the outer two of which are pivotally mounted to turn in a horizontal plane so that the spindles and wheels mounted thereon may yield as a whole when the vehicle is making a sharp turn and thereby avoid upsetting the vehicle.

For a full description of the invention and the merits thereof and also to acquire a knowledge of the details of construction of the means for effecting the result, reference is to be had to the following description and accompanying drawings, in which:

Figure 1 is a top plan view of a vehicle embodying the improvements of my invention. Fig. 2 is a detail perspective view of one end of the front axle embodying the invention. Fig. 3 is a transverse sectional view through said axle. Fig. 4 is a top plan view of one end of the front axle. Fig. 5 is a detail perspective view of parts of the thill supporting device, said parts being shown detached from each other and in juxtaposition.
Fig. 6 is a detail perspective view of the parts of the guard rail shown detached.

Corresponding and like parts are referred to in the following description and indicated in all the views of the drawings by the same reference characters.

Referring to the drawings the numeral 1 designates the main portion of the front axle and 2 and 3 designate respectively an upper plate and a lower plate provided with dowels 4 by which they are secured to the ends of the main section 1 or said plates may be secured to the said main section in other ways if desired. The plates 2 and 3 extend outwardly from the ends of the main section 1 one above the other as shown.

If desired, in addition to the dowels 4 or similar devices for securing the plates 2 and 3 to the main section 1 of the axle, I may employ a clamp 5 consisting of an upper clamp strap 6 of metal or the like either secured to or forming an integral part of the upper plate 2 and of inverted U-shape in cross section as shown provided with outwardly extending ends, and a lower clamp strap 7 which may be secured to or form an integral part of the lower plate 3. Bolts 8 or like fastening devices may be used to secure the two clamp straps together by being inserted through the projecting ends of the respective straps whereby to assist in binding the plates 2 and 3 securely in place at the ends of the main axle section 1.

The plates 2 and 3 at their extreme outer ends are provided with journal studs 9 extending towards each other and a pivoted axle section 11 is mounted between each pair of plates and journaled in said studs, so that the three sections of the main axle thus formed, produce a substantially continuous axle when the parts are in their normal position. The pivoted axle section 11 is provided at its outer end with a spindle 12 to receive the wheel 13.

The plate 14, which may be secured to or form an integral part of the upper plate 2, projects rearwardly from said upper plate near the outer end thereof and is provided with a downwardly extending pin or lug 15. A spring 16 is coiled around said pin, one end of said spring being formed into a hook 17 engaging with the rear extension of the plate 14, as shown in order to securely hold the spring in place, while the other end of said spring is free and is curved as illustrated in the drawings but bears against the inner end of its respective pivoted axle section 11. The latter is provided with a groove 19 in which the free end 18 of the spring is fitted so that the spring will be guided and maintained against the upward or downward movement when the pivoted axle section turns with respect to the main section. By this arrangement it will be understood that each spring 16 normally maintains the respective pivoted axle section 11 in longitudinal alinement with the main axle section 1, and that when the rim of the wheel engages with the body of the vehicle or a wheel plate as will be hereinafter described, this engagement will cause a relative movement between the main front axle section 11 which is on the inner side according to the movement, so as to prevent the wheel from riding under the vehicle body and upsetting the vehicle.

Near each outer end of the main section 1 of the front axle, each upper and lower plate 2 and 3 is provided with a rearwardly extending curved guide arm 20, said guide arms being provided with apertures 21 through which a pin 22 may be inserted as shown. If desired this pin may be in the form of a bolt. The guide arms 20 are preferably formed at their ends with lugs 23 connected together by a pin and socket connection 24 and 25. By the arrangement of the guide arms 20, which describe the arc of a circle coincident with the path of movement of the inner end of the pivoted axle section 11, the pin 22 may be inserted in any two apertures 21 to limit the relative movement of the pivoted axle section with respect to the main section at various adjustments.

26 designates a thill supporting frame which may be secured to or preferably formed with either the upper or the lower plate 2 or 3. In the present instance the said frame is integrally formed with the flange 2ª on the upper plate 2, it being understood that both of the plates are provided on their front sides with flanges 2ª and 3ª adapted to limit the forward movement of the inner end of the pivoted axle section 11. The cross bar 27 of the frame 26 is formed with notches on its lower side and a clip plate 28 is provided with up-turned side edges or flanges 29 adapted to enter the notches. Said clip plate 28 is also provided with an aperture 30 and a coacting clip plate 31 located on the upper side of the cross bar 27 is formed with a tongue 32 intended to be inserted through the aperture 30 and then bent in one direction or the other to hold the two clip plates together at one side. A bolt 38 extends through the two clip plates at the other side and by this attaching means the clip plates may be securely held on the cross bar 27 at different lateral adjustments. A leaf 33 is provided with upturned edges 34 embracing the bolted ends of the two clip plates 28 and 31, said leaf at that end receiving the bolt 38 and serving as a washer therefor while the upturned edges 34 assist in the securing action. The leaf 33 is preferably of spring metal and is bowed upwardly and rearwardly and provided at its free end with a side flange 35. 36 designates the thill iron designed to be inserted in the thill eye of the shaft of the vehicle, and 37 designates a post supporting the thill iron 36, the post being secured to or formed integrally with the upper clip plate 31. By the arrangement of the leaf 33 it will be seen that the free end of said leaf will bear with a spring action on the lower side of the thill eye and thus serve as an anti-rattler, while the side flange 35 will extend upwardly on the outer side of the thill eye and thus prevent the thill from coming off.

In connection with the parts before described my improved vehicle preferably embodies a guard rail designed to contact with and receive the wear of the wheel when a sharp turn is being made. This guard rail in the present instance comprises two brackets 39 adapted to be secured to the under side of the buggy by screws or the like and provided with downwardly extending arms 40 at the edges of the wagon body each arm being provided at its lower end with an inwardly extending portion 41 forming a stub shaft. Between these two stub shafts 41 a roller 42 is mounted, the stub shafts entering the ends of the roller and the parts being so arranged that the roller, which extends horizontally may freely turn. The arms 40 are preferably of such length that the roller will be carried level with the hub of the wheel so that as the rim of the wheel contacts with the roller there will be no liability of the wheel riding underneath the roller and thus upsetting the vehicle. By means of the freely mounted roller 42 the vehicle tire will be subjected to less abrasive wear and the advantage of this construction is evident, especially with wheels provided with rubber tires.

Having thus described the invention what is claimed as new is:

1. A vehicle provided with an axle constructed in a main section and two pivoted sections, the latter being provided with spindles for the reception of the traveling wheels, upper and lower plates provided with dowels entering the ends of said main section, said plates extending beyond such ends and provided at their outer ends with journal studs, the pivoted sections being journaled on said studs, a rearwardly extending plate carried at the outer end of one of the first named plates and provided with a lug, and a spring coiled around said lug and carried thereby, one end of said spring bearing against the rear side of the inner end of the respective pivoted axle section, as and for the purpose set forth.

2. A vehicle provided with an axle constructed in a main section and two pivoted sections, the latter being provided with spindles for the reception of the traveling wheels, upper and lower plates provided with dowels entering the ends of said main section, said plates extending beyond such ends and provided at their outer ends with journal studs, the pivoted sections being journaled on said studs, a rearwardly extending plate carried at the outer end of one of the first named plates and provided with a lug, and a coil spring encircling said lug, one end of said spring being provided with a hook engaging the rearwardly extending plate whereby to secure the spring in place, and the other end of said spring bearing against the rear side of the inner end of the pivoted axle section.

3. A vehicle provided with an axle constructed in a main section and two pivoted sections, the latter being provided with spindles for the reception of the traveling wheels, upper and lower plates provided with dowels entering the ends of said main section, said plates extending beyond such ends and provided at their outer ends with journal studs, the pivoted sections being journaled on said studs, a rearwardly extending plate carried at the outer end of one of the first named plates and provided with a lug, and a spring encircling said lug and provided with a free end bearing against the rear side of the inner end of the respective axle section, said pivoted axle section being formed on said rear side with a groove in which the end of the spring is mounted, for the purpose specified.

4. A vehicle provided with a front axle constructed in a main intermediate section and two end pivoted sections, upper and lower plates between which the pivoted end sections of the axle are journaled, a thill supporting frame carried at each end of the axle and embodying a cross bar formed on one side with notches, clip plates embracing said cross bar, one of said plates being provided with side flanges designed to enter said notches, one of said plates being provided with an aperture and the other with a tongue adapted to enter said aperture and be bent to secure it therein, a bolt securing the opposite end of said clip plates together, a post secured to one of said clip plates and provided with a thill iron, and a spring leaf receiving said bolt at one end and serving as a washer therefor, said spring leaf being curved upwardly and rearwardly and provided at its free end with a side flange, the free end of said spring leaf being adapted to bear against the under side of the thill eye received on said thill iron and the said side flange being adapted to bear against the outer side of said thill eye, as and for the purpose set forth.

In testimony whereof I affix my signature in presence of two witnesses.

MARTIN W. HEYENGA. [L. S.]

Witnesses:
FRED W. LONGAN,
JOSEPH A. TABKE.